United States Patent
Lee et al.

(10) Patent No.: US 12,467,978 B2
(45) Date of Patent: Nov. 11, 2025

(54) POWER-SAVING TYPE APPARATUS AND METHOD FOR MANAGING BATTERY

(71) Applicant: LG ENERGY SOLUTION, LTD., Seoul (KR)

(72) Inventors: Ye Seul Lee, Daejeon (KR); Seong Yeol Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 522 days.

(21) Appl. No.: 17/603,129

(22) PCT Filed: Jul. 23, 2020

(86) PCT No.: PCT/KR2020/009700
§ 371 (c)(1),
(2) Date: Oct. 12, 2021

(87) PCT Pub. No.: WO2021/049752
PCT Pub. Date: Mar. 18, 2021

(65) Prior Publication Data
US 2022/0187379 A1 Jun. 16, 2022

(30) Foreign Application Priority Data
Sep. 9, 2019 (KR) .................. 10-2019-0111784

(51) Int. Cl.
*H02J 7/00* (2006.01)
*B60L 58/12* (2019.01)
(Continued)

(52) U.S. Cl.
CPC ............ *G01R 31/382* (2019.01); *B60L 58/12* (2019.02); *G01R 31/34* (2013.01); *H01M 10/48* (2013.01);
(Continued)

(58) Field of Classification Search
CPC ..... G01R 31/382; G01R 31/367; B60L 58/12; H01M 10/48; H01M 2010/4271; H01M 2010/4278; H02J 7/0048
See application file for complete search history.

(56) References Cited

U.S. PATENT DOCUMENTS

| 5,781,013 A * | 7/1998 | Takahashi | H01M 10/48 320/155 |
| 5,869,951 A * | 2/1999 | Takahashi | H02J 7/0013 324/426 |

(Continued)

FOREIGN PATENT DOCUMENTS

| CN | 101162844 A | 4/2008 |
| CN | 101378202 A | 3/2009 |

(Continued)

OTHER PUBLICATIONS

International Search Report (PCT/ISA/210) issued in PCT/KR2020/009700, dated Oct. 23, 2020.
(Continued)

*Primary Examiner* — Arun C Williams
(74) *Attorney, Agent, or Firm* — Birch, Stewart, Kolasch & Birch, LLP

(57) ABSTRACT

A battery management apparatus according to an embodiment of the present invention may include a battery controller for receiving the operation state of a motor detected and detecting the state of charge of a battery, and a condition controller for applying a weight to at least one of the operation state of the motor and the state of charge of the battery to adjust operation conditions of the battery controller and allowing the battery controller to operate on the basis of the adjusted operation conditions.

22 Claims, 7 Drawing Sheets

(51) Int. Cl.
  *G01R 31/34* (2020.01)
  *G01R 31/382* (2019.01)
  *H01M 10/48* (2006.01)
  *G01R 31/367* (2019.01)
  *H01M 10/42* (2006.01)

(52) U.S. Cl.
  CPC .......... *H02J 7/0048* (2020.01); *G01R 31/367* (2019.01); *H01M 2010/4271* (2013.01); *H01M 2010/4278* (2013.01)

(56) References Cited

U.S. PATENT DOCUMENTS

| | | | |
|---|---|---|---|
| 5,917,305 A * | 6/1999 | Faulk | H01M 10/4257 320/106 |
| 6,898,438 B1 | 5/2005 | Uchida | |
| 2008/0048662 A1 | 2/2008 | Hirsch et al. | |
| 2008/0086247 A1 | 4/2008 | Gu et al. | |
| 2008/0100268 A1 | 5/2008 | Lim et al. | |
| 2008/0156553 A1* | 7/2008 | Hoogenraad | B60W 20/00 701/99 |
| 2009/0058372 A1 | 3/2009 | Tsuzuki | |
| 2010/0056325 A1* | 3/2010 | Kahn | B60W 10/26 477/3 |
| 2013/0261866 A1* | 10/2013 | Hoshiba | B60W 10/08 180/65.265 |
| 2013/0311028 A1 | 11/2013 | Ohkuma et al. | |
| 2014/0176085 A1 | 6/2014 | Maruno et al. | |
| 2016/0001719 A1 | 1/2016 | Frost et al. | |
| 2016/0272079 A1 | 9/2016 | Quoc-Tuan et al. | |
| 2018/0147952 A1 | 5/2018 | Kwon | |
| 2018/0267106 A1 | 9/2018 | Kusand et al. | |
| 2018/0288716 A1 | 10/2018 | Ghim et al. | |
| 2019/0006724 A1 | 1/2019 | Cho et al. | |
| 2019/0176642 A1* | 6/2019 | Diab | H02J 7/342 |
| 2019/0237816 A1 | 8/2019 | Kim et al. | |
| 2019/0252735 A1 | 8/2019 | Sung et al. | |
| 2019/0319467 A1 | 10/2019 | Kim | |
| 2023/0068623 A1 | 3/2023 | Kim et al. | |

FOREIGN PATENT DOCUMENTS

| | | |
|---|---|---|
| CN | 103339003 A | 10/2013 |
| CN | 107139762 A | 9/2017 |
| CN | 108432030 A | 8/2018 |
| CN | 108710084 A | 10/2018 |
| CN | 108899975 A | 8/2025 |
| EP | 3 536 541 A1 | 9/2019 |
| JP | 9-56184 A | 2/1997 |
| JP | 2000-134705 A | 5/2000 |
| JP | 2007-230398 A | 9/2007 |
| JP | 4023030 B2 | 12/2007 |
| JP | 2008-256609 A | 9/2008 |
| JP | WO2013/035511 A1 | 3/2013 |
| JP | 2013-140055 A | 7/2013 |
| JP | 2014-33604 A | 2/2014 |
| JP | 2016-66960 A | 4/2016 |
| JP | 2017-500836 A | 1/2017 |
| JP | 2018-151269 A | 9/2018 |
| JP | 2019-504450 A | 2/2019 |
| JP | 2019-129542 A | 8/2019 |
| KR | 10-2008-0018109 A | 2/2008 |
| KR | 10-2008-0039653 A | 5/2008 |
| KR | 10-2014-0060801 A | 5/2014 |
| KR | 10-1585627 - 81 | 7/2015 |
| KR | 10-2017-0081933 A | 7/2017 |
| KR | 10-1775964 B1 | 8/2017 |
| KR | 10-2018-0059591 A | 6/2018 |
| KR | 10-2018-0112242 A | 10/2018 |
| KR | 10-1967464 B1 | 4/2019 |
| KR | 10-2015168 B1 | 8/2019 |

OTHER PUBLICATIONS

European Office Action for European Application No. 20864169.6, dated Feb. 5, 2024.
Third Party Observation for European Application No. 20864169.6, dated Feb. 28, 2024.
Extended European Search Report for European Application No. 24221583.8, dated May 23, 2025.

* cited by examiner

[FIG. 1]
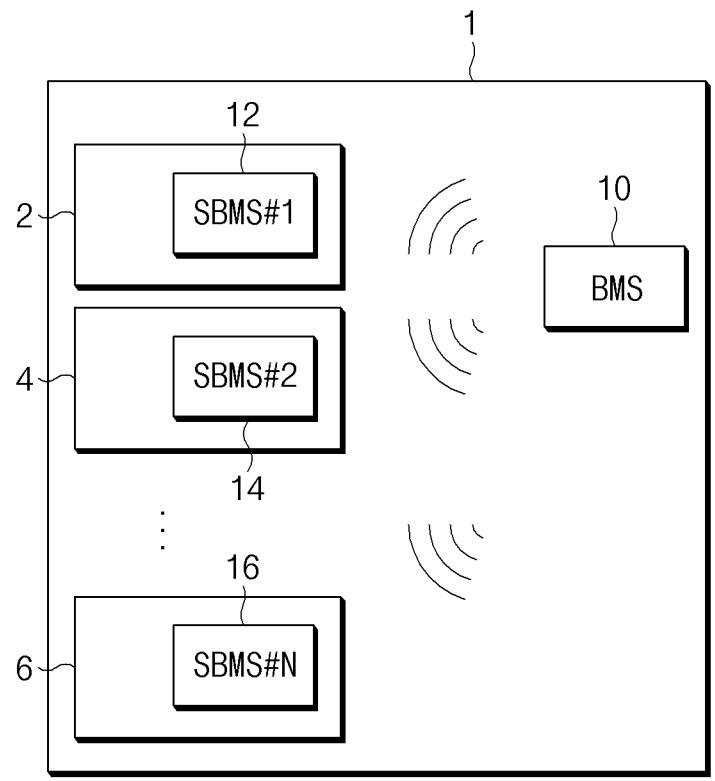
[FIG. 2]
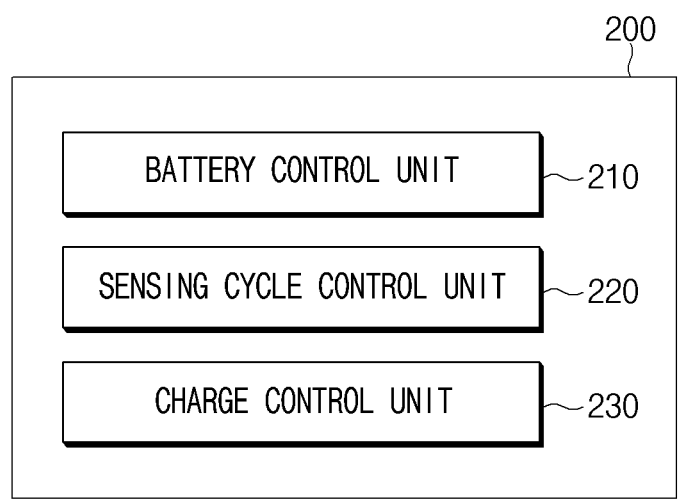

[FIG. 4]
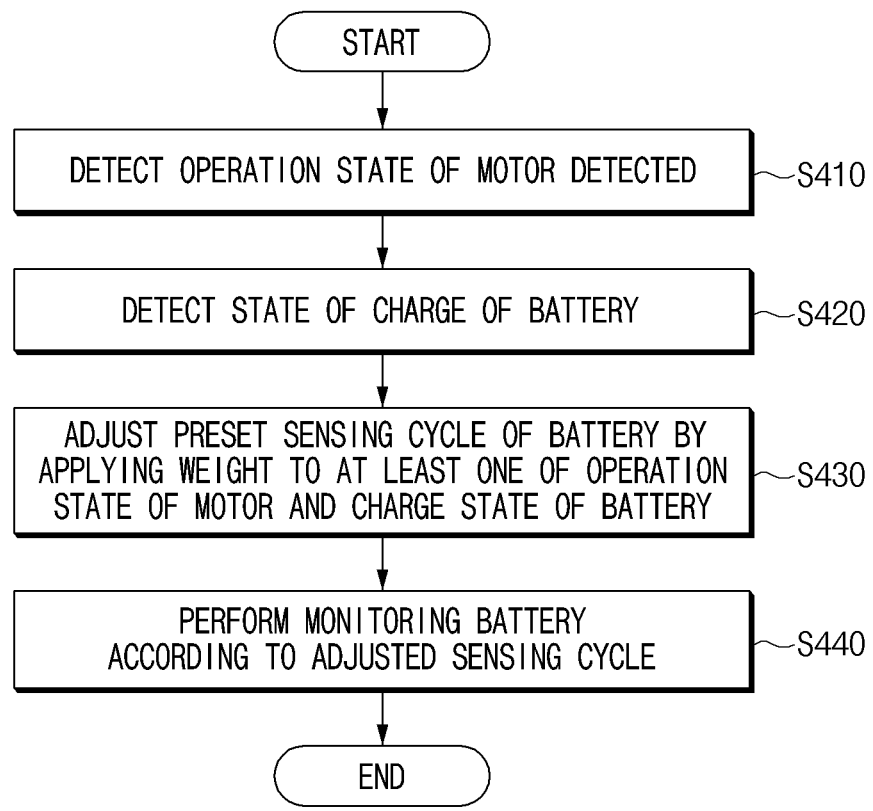
[FIG. 5]
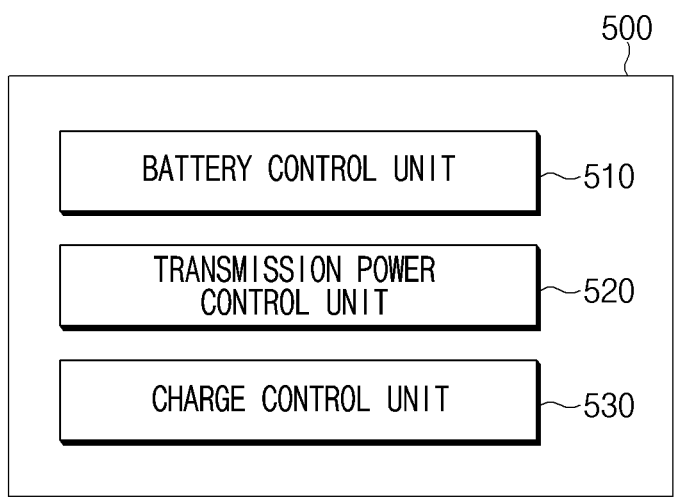

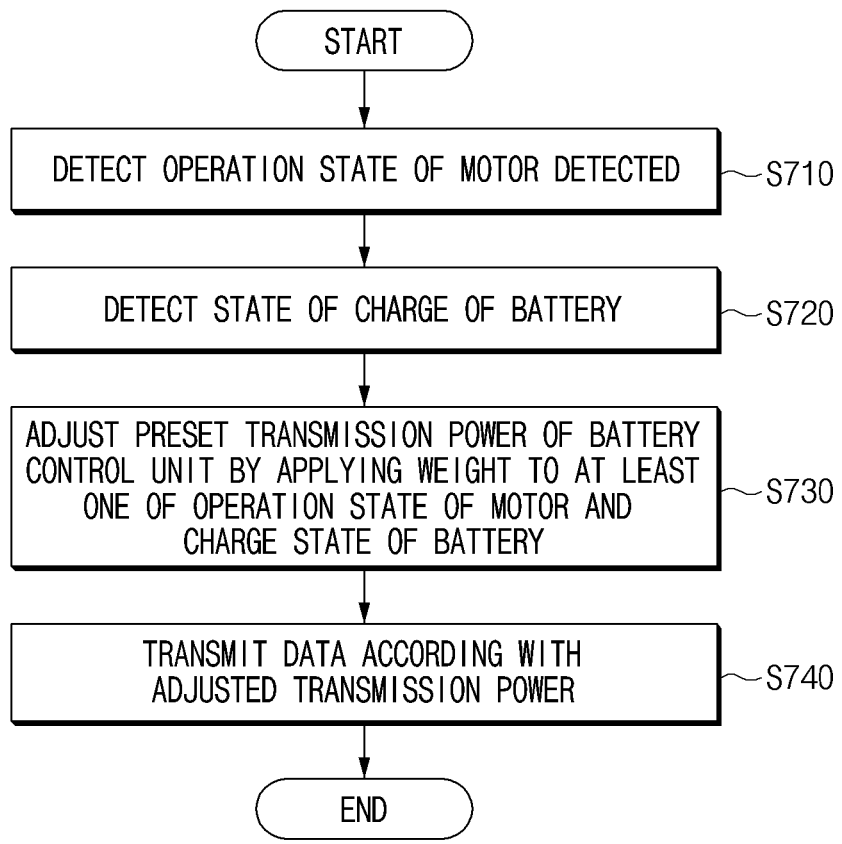

[FIG. 8A]
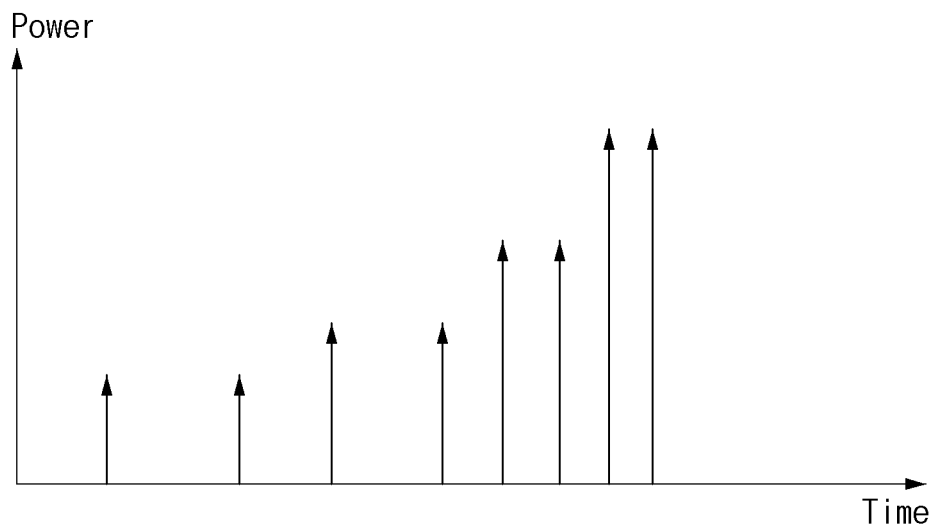
[FIG. 8B]
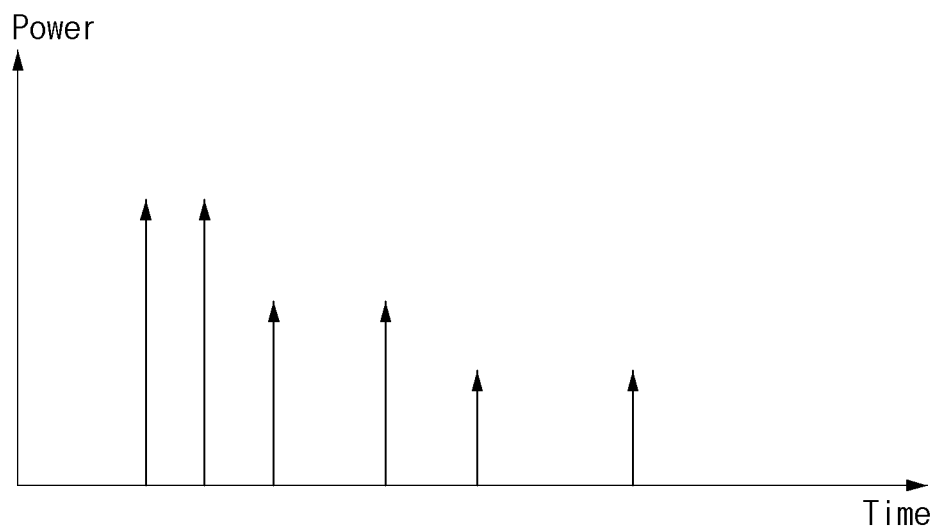

[FIG. 9]
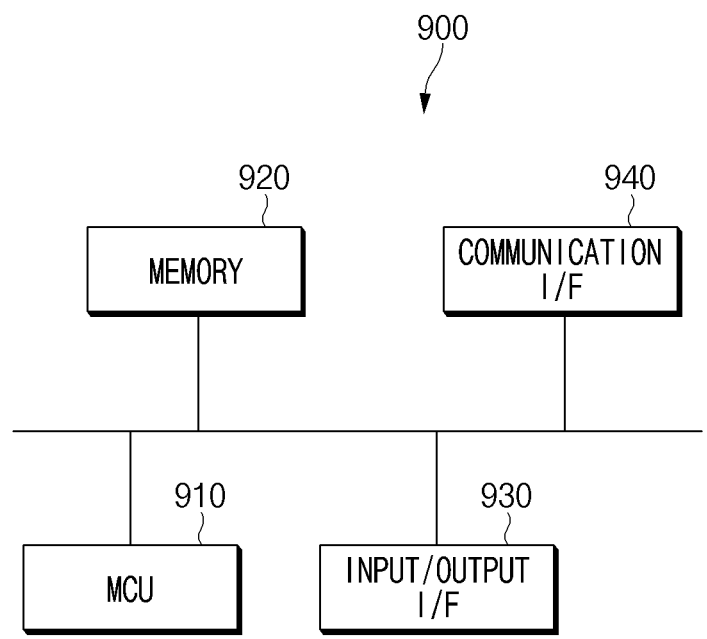

POWER-SAVING TYPE APPARATUS AND METHOD FOR MANAGING BATTERY

CROSS-REFERENCE TO RELATED APPLICATIONS

This application claims the benefit of Korean Patent Application No. 10-2019-0111784, filed on Sep. 9, 2019, in the Korean Intellectual Property Office, the disclosure of which is incorporated herein in its entirety by reference.

TECHNICAL FIELD

The present invention relates to a power-saving type apparatus and method for managing a battery, which control the sensing cycle and transmission power of a battery management system based on the state of a motor and a battery of a vehicle.

BACKGROUND ART

In general, when a battery of an electric vehicle is at a low state of charge, but a driver of the vehicle cannot use a charging station, the battery may just be discharged. In the case of an energy storage system (ESS) used in such a vehicle, as the amount of current consumed by a battery management system (BMS) becomes less, the power consumption of a battery may be reduced, and as the replacement cycle of a module becomes long, the cost for replacing the module may be saved.

In addition, an application specific integrated circuit (ASIC) inside the battery management system reads battery cell state information according to a predetermined sensing cycle, and has a problem of consuming current to receive battery cell information switched from a sleep mode even when battery consumption is not large.

Also, in a wireless battery management system, it is common that the wireless transmission power of a master device and a slave device, which perform wireless communication, are set to a maximum value in order to minimize data loss.

Therefore, the efficient use of power in the wireless battery management system using the voltage of a battery cell as a power source is very important.

DISCLOSURE OF THE INVENTION

Technical Problem

An aspect of the present invention is to provide a power-saving type apparatus and method for managing a battery, which actively control the sensing cycle and transmission power of a battery management system according to the state of the use of a battery, thereby minimizing the amount of battery consumption in a wireless battery management system to use power efficiently.

Technical Solution

According to an aspect of the present invention, there is provided a battery management apparatus including a battery controller configured to receive an operation state of a motor and detect a state of charge of a battery, and a condition controller for applying a weight to at least one of the operation state of the motor and the state of charge of the battery to adjust operation conditions of the battery controller and allow the battery controller to operate on the basis of the adjusted operation conditions.

The operation conditions of the battery management apparatus according to an embodiment of the present invention may include the sensing cycle of the battery, and the condition controller may be configured to adjust a preset sensing cycle of the battery and allow the battery controller to monitor the battery according to the adjusted sensing cycle.

The operation conditions of the battery management apparatus according to an embodiment of the present invention may include the transmission power of the battery controller, and the condition controller may be configured to adjust a preset transmission power of the battery controller and allow the battery controller to transmit a signal according to the adjusted transmission power.

The condition controller of the battery management apparatus according to an embodiment of the present invention may be configured to control the operations condition of the battery controller using a fuzzy function.

The weight of the battery management apparatus according to an embodiment of the present invention may be determined for each preset range of the operation state of the motor and the state of charge of the battery.

The battery controller of the battery management apparatus according to an embodiment of the present invention may be configured to receive the operation state of the motor from a motor sensor or a higher-level controller of a vehicle.

The battery management apparatus according to an embodiment of the present invention may further include a charge controller for controlling the charging of the battery, wherein the state of charge of the battery may be either directly transmitted from the charge controller to the battery controller, or transmitted to the higher-level controller, and then transmitted from the higher-level controller to the battery controller.

According to another aspect of the present invention, there is provided a battery management method including receiving an operation state of a motor, detecting the state of charge of a battery, and applying a weight to at least one of the operation state of the motor and the state of charge of the battery to adjust operation conditions of a battery controller.

The operation conditions of the battery management method according to an embodiment of the present invention may include the sensing cycle of the battery, and the adjusting of the operation conditions of the battery controller may include adjusting a preset sensing cycle of the battery and allowing the battery controller to perform monitoring the battery according to the adjusted sensing cycle.

The operation conditions of the battery management method according to an embodiment of the present invention may include the transmission power of the battery controller, and the adjusting of the operation conditions of the battery controller may including adjusting a preset transmission power of the battery controller and allowing the battery controller to transmit a signal according to the adjusted transmission power.

Effects of the Invention

According to a power-saving type apparatus and method for managing a battery of the present invention, the sensing cycle and transmission power of a battery management system is actively controlled according to the state of the use of a battery, so that the amount of battery consumption is

BRIEF DESCRIPTION OF THE DRAWINGS

FIG. 1 is a configuration diagram of a battery pack including a battery management system according to an embodiment of the present invention;

FIG. 2 is a block diagram showing a configuration of a battery management apparatus according to an embodiment of the present invention;

FIG. 4 is a flowchart showing a battery management method according to an embodiment of the present invention;

FIG. 5 is a block diagram showing a configuration of a battery management apparatus according another an embodiment of the present invention;

FIG. 7 is a flowchart showing a battery management method according another an embodiment of the present invention;

FIG. 8A is a diagram showing the sensing cycle and transmission power of a battery when a vehicle is driven at a constant speed and then at a high speed;

FIG. 8B is a diagram showing the sensing cycle and transmission power of a battery when a vehicle is driven at a high speed and then at a constant speed; and FIG. 9 is a block diagram showing a hardware configuration of a battery management apparatus according to an embodiment of the present invention.

MODE FOR CARRYING OUT THE INVENTION

Figure 3:
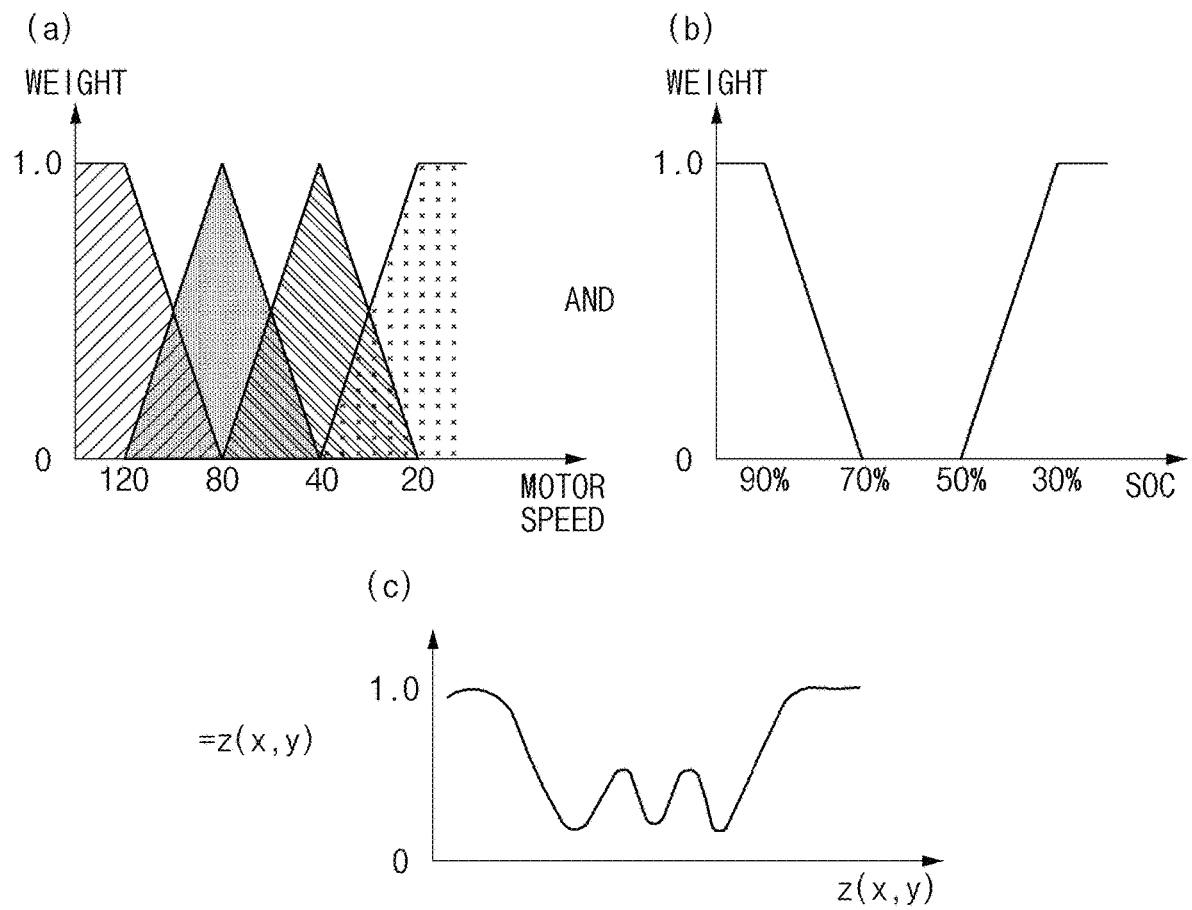
FIG. 3 is a diagram showing a method for calculating a sensing cycle in a battery management apparatus according to an embodiment of the present invention.

Hereinafter, various embodiments of the present invention will be described in detail with reference to the accompanying drawings. In the present document, like reference numerals are used for like elements throughout the drawings, and redundant descriptors of the like elements are omitted.

For the various embodiments of the present invention disclosed in the present document, specific structural to functional descriptions are merely illustrative of the present invention. The various embodiments of the present invention may be embodied in various forms and should not be construed as limited to the embodiments set forth herein.

Terms such as "a first," "a second," "first," and "second" used in various embodiments may modify various components regardless of the order and/or importance thereof, and do not limited the corresponding components. For example, a first component may be referred to as a second component without departing from the scope of the present invention, and similarly, a second component may also be referred to as a first component.

The terms used in this document are only used to describe specific embodiments, and may not be intended to limit the scope of other embodiments. Singular expressions may include plural expressions unless the context clearly indicates otherwise.

All the terms used herein, including technical or scientific terms, may have the same meanings as those commonly understood by those skilled in the art of the present invention. Terms that are defined in a dictionary commonly used should be interpreted as having the same or similar meaning to the meaning in the context of the related art, and should not be interpreted as having an ideal or overly formal meaning unless explicitly defined in the present document. In some cases, even the terms defined in this document should not be interpreted as excluding embodiments of the present invention.

FIG. 1 is a configuration diagram of a battery pack including a battery management system according to an embodiment of the present invention.

In a battery module 1, a plurality of battery cells 2, 4, and 6 are connected either in series or in parallel. In each of the battery cells 2, 4, and 6, slave battery management systems 12, 14, and 16 are respectively disposed. Each slave battery management system 12, 14, and 16 performs monitoring by measuring the temperature, voltage, or current of the respective battery cell 2, 4, and 6, transmits information obtained by the monitoring to a higher-level system, and receives a battery cell control command from the higher-level to control the respective connected battery cell.

The plurality of battery cells 2, 4, and 6 are connected either in series or in parallel to form the battery module 1. In the battery module 1, a master battery management system 10 is disposed. The master battery management system 10 performs monitoring by measuring the temperature, voltage, or current of the battery module 1. In addition, the master battery management system 10 receives monitoring information of each battery cell from the slave battery management systems 12, 14, and 16 disposed in each battery cell and transmits the same to a higher-level system, and receives a specific task performance command from the higher-level system and transmits the same to corresponding slave battery management systems 12, 14, and 16.

FIG. 2 is a block diagram showing a configuration of a battery management apparatus according to an embodiment of the present invention.

Referring to FIG. 2, a battery management apparatus 200 according to an embodiment of the present invention may include a battery control unit 210, a sensing cycle control unit 220, and a charge control unit 230. At this time, the battery management apparatus 200 may correspond to both the master battery management system and the slave battery management system of FIG. 1. In addition, according to FIG. 2, a condition control unit of the battery management apparatus 200 according to an embodiment of the present invention may be represented by the sensing cycle control unit 220.

The battery control unit 210 may receive the operation state of a motor detected, and may detect the state of charge of a battery. In this case, the battery control unit 210 may receive the operation state of the motor directly from a motor sensing unit which detects the operation of a motor of a vehicle, or may receive the operation state of the motor from a higher-level controller.

In addition, the battery control unit 210 may perform monitoring of the battery, and may adjust the sensing cycle of the battery or the transmission power of a signal according to the state of the battery or the motor.

The sensing cycle control unit 220 may adjust a preset sensing cycle of a battery by applying a weight to at least one of the operation state of the motor received from the battery control unit 210 and the state of charge of the battery detected therefrom. At this time, the weight may be determined for each preset range of the operation state of the motor and the state of charge of the battery. This will be described later in detail with reference to FIG. 3.

In addition, the sensing cycle control unit 220 may allow the battery control unit 210 to perform monitoring a battery according to the adjusted sensing cycle. In this case, the sensing cycle control unit 220 may use a fuzzy function to adjust the sensing cycle of the battery as to be described later.

The charge control unit 230 may control the charging of a battery. The charge control unit 230 may transmit the state of charge of the battery directly to the battery control unit 210. In addition, the charge control unit 230 may transmit the state of charge of the battery to a higher-level controller, and then allow the same to be transmitted from the higher-level controller to the battery control unit 210.

As described above, according the battery management apparatus according to an embodiment of the present invention, the sensing cycle and transmission power of a battery management system is actively controlled according to the state of the use of a battery, so that the amount of battery consumption is minimized in a wireless battery management system, making it possible to use power efficiently.

FIG. 3 is a diagram showing a method for calculating a sensing cycle in a battery management apparatus according to an embodiment of the present invention.

Referring to FIG. 3, a weight graph (a) for the load (speed) of a motor, a weight graph (b) for the SOC of a battery, and a final sensing cycle (c) obtained by combining (a) and (b) are shown. However, the graphs of FIG. 3 are only exemplary. A weight may be calculated in various manners for each case.

For example, as shown in the graph of (a) of FIG. 3, the speed of a motor may be classified according to a fuzzy rule into ranges of very high (120 km/h or greater), high (80 km/h to 120 km/h), normal (40 km/h to 80 km/h), low (20 km/h to 40 km/h), very low or stop (20 km/h or less).

In addition, as shown in the graph of (b) of FIG. 3, the SOC of a battery may be classified into ranges of very high (90% or greater), high (70% to 90%), normal (50% to 70%), low (30% to 50%), very low or stop (30% or less). Referring to (b) of FIG. 3, as for the SOC, if the remaining battery capacity is high, an existing sensing cycle is maintained, and if the remaining battery capacity is at an intermediate level, the weight for the sensing cycle may be reduced. If the remaining battery capacity is low, the weight for the sensing cycle may be increased to confirm the state of the battery quickly.

The "AND" of FIG. 3 means that the weight for the load (speed) of a motor and the weight for the SOC of a battery are summed. At this time, FIG. 3 is not limited to a logical operation AND only. A logical operation OR may also be applied according to an algorithm, and various operations such as +, x, Min, and Max may be applied.

For example, when referring to FIG. 3, when a basic sensing cycle is 100 msec, the speed of a motor is 140 km/h, and the SOC is 90%, a final sensing cycle may be calculated as follows according to the speed of the motor and the SOC of the battery.

$$100\ \text{msec} \times z(140\ \text{km}, 90\%) = 100\ \text{msec} \times (1.0\ \text{AND}\ 1.0)$$
$$= 100\ \text{msec} \times 1.0 = 100\ \text{msec}$$

In addition, according to the battery management apparatus according to an embodiment of the present invention, only one of the load of a motor and the SOC of a battery may be selected to adjust a sensing cycle.

FIG. 4 is a flowchart showing a battery management method according to an embodiment of the present invention.

Referring to FIG. 4, first, the battery control unit 210 receives the operation state of a motor detected (step S410). At this time, the operation state of the motor may be detected by a motor sensing unit provided in a vehicle. In addition, the motor sensing unit may transmit the detected operation state of the motor directly to the battery control unit 210, or may transmit the same to the battery control unit 210 though a higher-level controller.

Then, battery control unit 210 detects the state of charge of a battery (step S420). In this case, the state of charge of the battery may be detected by a separate charge control unit 230. At this time, the state of charge of the battery may be transmitted directly to the battery control unit 210 from the charge control unit 230, or may be transmitted to the battery control unit 210 through a higher-level controller.

Next, a preset sensing cycle of the battery may be adjusted by applying a weight to at least one of the detected operation state of the motor and the detected state of charge of the battery (step S430). At this time, the sensing cycle of the battery may be adjusted using a fuzzy function. In addition, the weight for adjusting a sensing cycle may be applied to each range after dividing the operation state of the motor and the state of charge of the battery into a predetermined range.

Then, the battery control unit 210 performs monitoring of the battery according to the adjusted sensing cycle (step S440). As described above, according to the battery management method according to an embodiment of the present invention, the sensing cycle of a battery may be actively changed according to the state of the use of the battery, so that power may be efficiently used.

FIG. 5 is a block diagram showing a configuration of a battery management apparatus according another an embodiment of the present invention.

Referring to FIG. 5, a battery management apparatus 500 according to an embodiment of the present invention may include a battery control unit 510, a transmission power control unit 520, and a charge control unit 530. According to FIG. 5, a condition control unit of the battery management apparatus 200 according to an embodiment of the present invention may be represented by the transmission power control unit 520.

The battery control unit 510 may receive the operation state of a motor detected, and may detect the state of charge of a battery. In this case, the battery control unit 510 may receive the operation state of the motor directly from a motor sensing unit which detects the operation of a motor of a vehicle, or may receive the operation state of the motor from a higher-level controller.

In addition, the battery control unit 510 may perform monitoring of the battery, and may adjust the sensing cycle of the battery or the transmission power of a signal according to the state of the battery or the motor.

The transmission power control unit 520 may adjust a preset transmission power of the battery control unit 510 by applying a weight to at least one of the operation state of the motor received from the battery control unit 510 and the state of charge of the battery detected therefrom. At this time, the weight may be determined for each preset range of the operation state of the motor and the state of charge of the battery. This will be described later in detail with reference to FIG. 6.

In addition, the transmission power control unit 520 may allow the battery control unit 510 to transmit a signal with transmission power. In this case, the transmission power control unit 520 may use a fuzzy function to adjust the transmission power of the battery control unit 510 as to be described later.

The charge control unit 530 may control the charging of a battery. The charge control unit 530 may transmit the state of charge of the battery directly to the battery control unit 510. In addition, the charge control unit 530 may transmit the state of charge of the battery to a higher-level controller, and then allow the same to be transmitted from the higher-level controller to the battery control unit 510.

As described above, according the battery management apparatus according to an embodiment of the present invention, the sensing cycle and transmission power of a battery management system is actively controlled according to the state of the use of a battery, so that the amount of battery consumption is minimized in a wireless battery management system, making it possible to use power efficiently.

Figure 6:
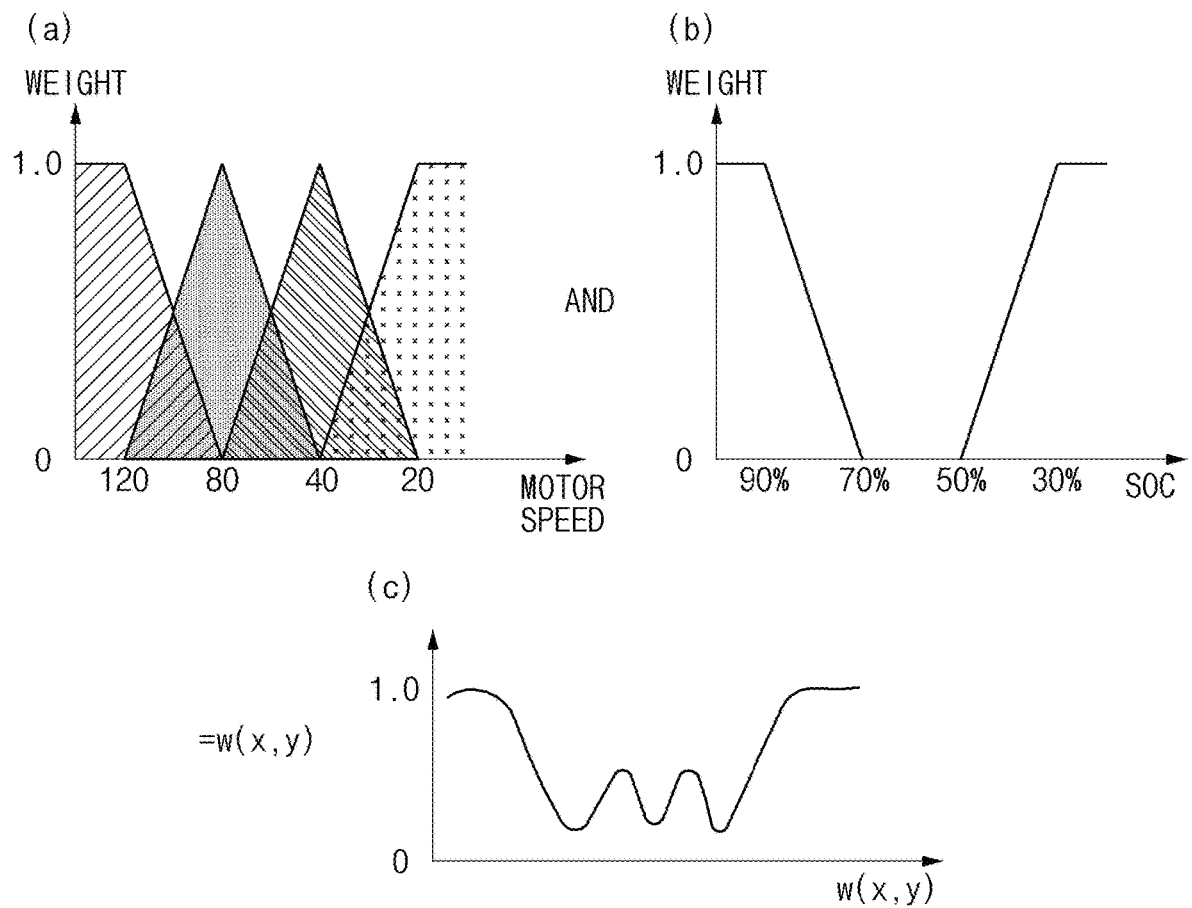
FIG. 6 is a diagram showing a method for calculating transmission power in a battery management apparatus according another an embodiment of the present invention.

FIG. 6 is a diagram showing a method for calculating transmission power in a battery management apparatus according another an embodiment of the present invention.

Referring to FIG. 6, a weight graph (a) for the load (speed) of a motor, a weight graph (b) for the SOC of a battery, and a final transmission power (c) obtained by combining (a) and (b) are shown. However, the graphs of FIG. 6 are only exemplary. A weight may be calculated in various manners for each case.

For example, as shown in the graph of (a) of FIG. 6, the speed of a motor may be classified according to a fuzzy rule into ranges of very high (120 km/h or greater), high (80 km/h to 120 km/h), normal (40 km/h to 80 km/h), low (20 km/h to 40 km/h), very low or stop (20 km/h or less).

In addition, as shown in the graph shown in (b) of FIG. 6, the SOC of a battery nay be classified into ranges of very high (90% or greater), high (70% to 90%), normal (50% to 70%), low (30% to 50%), very low or stop (30% or less).

Referring to the graph shown in (b) of FIG. 6, as for the SOC, if the remaining battery capacity is high, existing transmission power is maintained, and if the remaining battery capacity is at an intermediate level, the weight for the transmission power may be reduced. If the remaining battery capacity is low, the weight for the transmission power may be increased to confirm the state of the battery quickly.

The AND of FIG. 6 means that the weight for the load (speed) of a motor and the weight for the SOC of a battery are summed. At this time, FIG. 6 is not limited to a logical operation AND only. A logical operation OR may also be applied according to an algorithm, and various operations such as +, x, Min, and Max may be applied.

For example, when referring to FIG. 6, when basic transmission power is 20 dBm, the speed of a motor is 140 km/h, and the SOC is 60%, final transmission power may be calculated as follows according to the speed of the motor and the SOC of the battery. In addition, in the following equation, AND was used as an average value (A AND B=(A+B)/2).

$$20\ dBm \times z(140\ km, 60\%) = 20\ dBm \times (1.0\ AND\ 0) = 20\ dBm \times 0.5 = 10\ dBm.$$

In addition, according to the battery management apparatus according to an embodiment of the present invention, only one of the load of a motor and the SOC of a battery may be selected to adjust transmission power.

FIG. 7 is a flowchart showing a battery management method according another an embodiment of the present invention.

Referring to FIG. 7, first, the battery control unit 510 receives the operation state of a motor detected (step S710). At this time, the operation state of the motor may be detected by a motor sensing unit provided in a vehicle. In addition, the motor sensing unit may transmit the detected operation state of the motor directly to the battery control unit 510, or may transmit the same to the battery control unit though a higher-level controller.

Then, battery control unit 510 detects the state of charge of a battery (step S720). In this case, the state of charge of the battery may be detected by a separate charge control unit 530. At this time, the state of charge of the battery may be transmitted directly to the battery control unit 510 from the charge control unit 530, or may be transmitted to the battery control unit 510 through a higher-level controller.

Next, a preset transmission power of the battery may be adjusted by applying a weight to at least one of the detected operation state of the motor and the detected state of charge of the battery (step S730). At this time, the transmission power of the battery control unit 510 may be adjusted using a fuzzy function. In addition, the weight for adjusting transmission power may be applied to each range after dividing the operation state of the motor and the state of charge of the battery into a predetermined range.

Then, the battery control unit 510 performs monitoring of the battery according to the adjusted transmission power (step S740). As described above, according to the battery management method according to an embodiment of the present invention, the transmission power of the battery control unit 510 may be actively changed according to the state of the use of the battery, so that power may be efficiently used.

FIG. 8A is a diagram showing the sensing cycle and transmission power of a battery when a vehicle is driven at a constant speed and then at a high speed. In addition, FIG. 8B is a diagram showing the sensing cycle and transmission power of a battery when a vehicle is driven at a high speed and then at a constant speed.

Referring to 8A, when battery consumption increases rapidly, such as when a driver of a vehicle is driving at a constant speed and then gradually speeding up, enters an uphill road, or starts fast charging, the cycle of sensing the state of a battery becomes gradually shorter and communication is achieved with greater transmit power, so that the state of the battery may be monitored as accurately as possible.

Referring to FIG. 8B, when a driver of a vehicle enters a constant speed driving mode from a driving mode in which the state of a battery rapidly changes as in the above examples, the cycle of sensing the state of the battery becomes gradually longer and communication is achieved with relatively less transmission power, so that battery power may be efficiently managed without unnecessary monitoring.

FIG. 9 is a block diagram showing a hardware configuration of a battery management apparatus according to an embodiment of the present invention.

As shown in FIG. 9, a battery management apparatus 900 may have a micro-controller (MCU) 910 for controlling various processing and each component, a memory 920 in which an operating system program, various programs (for example, a battery pack abnormality diagnosis program or a battery pack temperature estimation program), and the like are stored, an input/output interface 930 for providing an input interface and an output interface between a battery cell module and/or a switching unit (for example, a semiconductor switching element), and a communication interface 940 capable of communicating with the outside (for example, a higher-level controller) through a wired/wireless communication network. As described above, a computer program according to the present invention is stored in the memory 920 and processed by the micro-controller 910, and thus, may be implemented as, for example, a module which performs each functional block illustrated in FIG. 2.

In the above, even if all the components constituting the embodiments of the present invention have been described as being combined or combined to operate as one, the present invention is not necessarily limited to these embodiments. That is, if within the scope of the present invention, all of the components maybe selectively combined and operated as one or more.

In addition, the terms "include," "consist," or "have" as described above mean that a corresponding component may be intrinsic, unless specifically stated otherwise, and it should interpreted as including other components rather than excluding other components. All terms including technical or scientific terms have the same meanings as those commonly understood by those skilled in the art to which the present invention pertains, unless defined otherwise. Terms commonly used as those defined in a commonly used dictionary should be construed as being consistent with the context of the relevant art, and are not to be construed in an idealized or overly formal sense unless expressly defined in the present invention.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of protection of the present invention should be construed by the following claims, and all technical concepts within the scope of the present invention should be construed as being included within the scope of the rights of present invention.

The invention claimed is:

1. A battery management apparatus, comprising:
a battery controller configured to:
receive an operation state of a motor, and
detect a state of charge of a battery; and
a condition controller configured to:
apply a first index to the operation state of the motor and apply a second index to the state of charge of the battery to adjust operation conditions of the battery controller, and
allow the battery controller to operate based on the adjusted operation conditions based on a combined index of the first index and the second index,
wherein the operation conditions comprise a sensing cycle of the battery controller or a transmission power of the battery controller.

2. The battery management apparatus of claim 1, wherein the condition controller is configured to adjust a preset sensing cycle of the battery and allows the battery controller to monitor the battery according to the adjusted sensing cycle.

3. The battery management apparatus of claim 1, wherein the condition controller adjusts a preset transmission power of the battery controller and allows the battery controller to transmit a signal according to the adjusted transmission power.

4. The battery management apparatus of claim 1, wherein the condition controller is configured to control the operations condition of the battery controller using fuzzy logic based on a combination of the operation state of the motor having a plurality of speed ranges of different speeds and the state of charge of the battery having a plurality of state of charge (SOC) ranges of different charges provided by the combined index.

5. The battery management apparatus of claim 1, wherein the first index is determined for each preset range of the operation state of the motor and the second index is determined for each preset range of the state of charge of the battery, and
wherein the first index varies in each preset range of the operation state of the motor and the second index varies in each preset range of the state of charge of the battery.

6. The battery management apparatus of claim 1, wherein the battery controller receives the operation state of the motor from a motor sensor or a higher-level controller of a vehicle.

7. The battery management apparatus of claim 6, further comprising:
a charge controller configured to control the charging of the battery,
wherein the state of charge of the battery is either directly transmitted from the charge controller to the battery controller, or transmitted to the higher-level controller, and then transmitted from the higher-level controller to the battery controller.

8. A battery management method comprising:
receiving an operation state of a motor;
detecting the state of charge of a battery; and
applying a first index to the operation state of the motor and applying a second index to the state of charge of the battery to adjust operation conditions of a battery controller based on a combined index of the first index and the second index,
wherein the operation conditions comprise a sensing cycle of the battery controller or a transmission power of the battery controller.

9. The method of claim 8, wherein the adjusting of the operation conditions of the battery controller includes adjusting a preset sensing cycle of the battery and allowing the battery controller to monitor the battery according to the adjusted sensing cycle.

10. The method of claim 8, wherein the adjusting of the operation conditions of the battery controller includes adjusting a preset transmission power of the battery controller and allowing the battery controller to transmit a signal according to the adjusted transmission power.

11. The method of claim 8, wherein the operation conditions of the battery controller are adjusted using fuzzy logic based on a combination of the operation state of the motor having a plurality of speed ranges of different speeds and the state of charge of the battery having a plurality of state of charge (SOC) ranges of different charges provided by the combined index.

12. The method of claim 8, wherein the first index is determined for each preset range of the operation state of the motor and the second index is determined for each present range of the state of charge of the battery, and
wherein the first index varies in each preset range of the operation state of the motor and the second index varies in each preset range of the state of charge of the battery.

13. The method of claim 8, wherein the operation state of the motor is received from a motor sensor or a higher-level controller of a vehicle.

14. The method of claim 8, further comprising:
controlling a charging of the battery based on the state of charge of the battery either directly transmitted from a charge controller to the battery controller, or transmitted to a higher-level controller, and then transmitted from the higher-level controller to the battery controller.

15. The method of claim 9, wherein the preset sensing cycle of the battery is:
maintained when a remaining state of charge of the battery is higher than a predetermined level;
reduced when the remaining state of charge is at the predetermined level; and
increased when the remaining state of charge is lower than the predetermined level.

16. The method of claim 15, wherein the predetermined level is about 50% to 70% of the state of charge of the battery.

17. The battery management apparatus of claim 2, wherein, based on the combined index, the preset sensing cycle of the battery is:
maintained when a remaining state of charge of the battery is higher than a predetermined level;
reduced when the remaining state of charge is at the predetermined level; and
increased when the remaining state of charge is lower than the predetermined level.

18. The battery management apparatus of claim 17, wherein the predetermined level is about 50% to 70% of the state of charge of the battery.

19. A battery management apparatus, comprising:
a battery controller configured to:
receive an operation state of a motor of a device, and detect a state of charge of a battery of the device; and
a condition controller configured to:
apply a first index to the operation state of the motor and apply a second index to the state of charge of the battery to adjust operation conditions of the battery controller, the operating conditions including at least one of a sensing cycle of the battery and a transmission power of the battery controller, and
allow the battery controller to operate based on the adjusted operation conditions based on a combined index of the first index and the second index.

20. The battery management apparatus of claim 19, wherein the condition controller is configured to adjust at least one of a preset sensing cycle of the battery and a preset transmission power of the battery controller, and allows the battery controller to at least one of monitor the battery according to the adjusted sensing cycle and transmit a signal according to the adjusted transmission power.

21. The battery management apparatus of claim 3, wherein, based on the combined index, the preset transmission power of the battery controller is:
maintained when a remaining battery capacity is higher than a predetermined level;
reduced when the remaining battery capacity is at the predetermined level; and
increased when the remaining battery capacity is lower than the predetermined level.

22. The method of claim 10, wherein, based on the combined index, the preset transmission power of the battery controller is:
maintained when a remaining battery capacity is higher than a predetermined level;
reduced when the remaining battery capacity is at the predetermined level; and
increased when the remaining battery capacity is lower than the predetermined level.

* * * * *